US012744685B2

(12) United States Patent
Henry et al.

(10) Patent No.: US 12,744,685 B2
(45) Date of Patent: Sep. 22, 2026

(54) METHOD FOR COMPUTER-IMPLEMENTED SERVICE PROVISION IN A BLOCKCHAIN, CORRESPONDING BLOCKCHAIN NETWORK NODE AND COMPUTER PROGRAM

(71) Applicant: Orange, Issy-les-Moulineaux (FR)

(72) Inventors: Tiphaine Henry, Chatillon Cedex (FR); Julien Hatin, Chatillon Cedex (FR); Nassim Laga, Chatillon Cedex (FR); Blaise Carnevillier, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 67 days.

(21) Appl. No.: 18/688,324

(22) PCT Filed: Sep. 1, 2022

(86) PCT No.: PCT/FR2022/051648
§ 371 (c)(1),
(2) Date: Feb. 29, 2024

(87) PCT Pub. No.: WO2023/031561
PCT Pub. Date: Mar. 9, 2023

(65) Prior Publication Data
US 2024/0380622 A1 Nov. 14, 2024

(30) Foreign Application Priority Data
Sep. 3, 2021 (FR) ....................................... 2109204

(51) Int. Cl.
*H04L 29/06* (2006.01)
*H04L 9/00* (2022.01)

(52) U.S. Cl.
CPC ................ *H04L 9/50* (2022.05); *H04L 9/008* (2013.01)

(58) Field of Classification Search
CPC .................................. H04L 9/50; H04L 9/008
See application file for complete search history.

(56) References Cited

U.S. PATENT DOCUMENTS

2020/0145200 A1 * 5/2020 Le Van Gong ........... H04L 9/30
2020/0372576 A1 * 11/2020 Sundaram .............. G06Q 10/10
(Continued)

OTHER PUBLICATIONS

Tso et al., "Distributed E-Voting and E-Bidding Systems Based on Smar Contract", Electronics 2019, 8, 422, Apr. 11, 2019.
(Continued)

*Primary Examiner* — Evans Desrosiers
(74) *Attorney, Agent, or Firm* — Knobbe, Martens, Olson & Bear, LLP

(57) ABSTRACT

The method concerns goods or services based on a blockchain information decentralised storage technology. Blockchain infrastructures have been enriched with smart contracts. The emergence of these smart contracts opens up new applications for blockchains, particularly in the exchange of services. However, the lack of confidentiality of solutions based on the use of smart contracts is an obstacle to their development. In order to solve this problem, the method is based on the introduction of an oracle capable of processing encrypted offers without having access to the decrypted content of these offers. An oracle is a third-party service run by several nodes, interfacing the blockchain network with the world. An oracle can feed external information back to a smart contract, or perform calculations on behalf of the smart contract in order to reduce the latter's calculation costs. Oracles are trusted entities.

18 Claims, 4 Drawing Sheets

(56) References Cited

U.S. PATENT DOCUMENTS

| | | | | |
|---|---|---|---|---|
| 2021/0160227 | A1* | 5/2021 | Li | H04L 63/0442 |
| 2022/0210688 | A1* | 6/2022 | Baglin | H04W 4/40 |

OTHER PUBLICATIONS

Galal et al., "Verifiable Sealed-Bid Auction on the Ethereum Blockchain", IFCA 2019, First Online Feb. 10, 2019.
Bunz et al., "Zether: Towards Privacy in a Smart Contract World", Financial Cryptography and Data Security, First Online: Jul. 18, 2020.
Bourse et al., "Improved Secure Integer Comparison via Homomorphic Encryption", CT-RSA Feb. 14, 2020.
Bost et al., "Machine Learning Classification over Encrypted Data", NDSS, May 13, 2014.
Togan et al., "Comparison-Based Computations Over Fully Homomorphic Encrypted Data", IEEE, May 29-31, 2014.
Blass et al., "Strain: A Secure Auction for Blockchains", European Symposium on Research in Computer, First Online Aug. 8, 2018.
Galal et al., "Trustee: Full Privacy Preserving Vickrey Auction on Top of Ethereum", FC 2019, Workshops, pp. 190-207, https://link.springer.com/chapter/10.1007/978-3-030-43725-1_14, First Online Mar. 13, 2020.
Ma et al., "Fully Private Auctions for the Highest Bid", ACM TURC 2019, May 17-19, 2019, Chengdu, China.
Sonnino et al., "AStERISK: Auction-based Shared Economy Resolution System for blockchain", Workshop on Decentralized IoT Systems and Security (DISS) 2019 Feb. 24, 2019, San Diego.
Król et al., "PASTRAMI: Privacy-preserving, Auditable, Scalable & Trustworthy Auctions for Multiple Items", ACM 2020, Dec. 7-11, 2020, Delft Netherlands.
Sarfaraz et al., "A tree structure-based improved blockchain framework for a secure online bidding system", Computers & Security 102 (2021), Dec. 10, 2020.
Baranwal, "Blockchain Based Full Privacy Preserving Public Procurement", MPC, ICBC 2020, https://link.springer.com/chapter/10.1007/978-3-030-59638-51, Sep. 15, 2020.
Rege et al., "Bluetooth Communication using Hybrid Encryption Algorithm based on AES and RSA", International Journal of Computer Applications, vol. 71, No. 22, Jun. 2013.
Gleim, Bill et al., "Enterprise Ethereum Alliance Off-Chain Trusted Compute Specification v1.1", Oct. 8, 2019, pp. 1-65, Retrieved from the Internet: https://web.archive.org/web/20191213044306/https://entethalliance.org/wp-content/uploads/2019/11/EEA_Off-Chain_Trusted_Compute_Specification_vl.1.pdf.
Zhang, Lei et al., "Off-Chain Trusted Computing", vol. 3, No. 2, Jun. 1, 2020, pp. 8-9, IEEE Internet of Things Magazine, Retrieved from the Internet: https://ieeexplore.ieee.org/stamp/stamp.jsp?tp=&arnumber=9125420.
Anonymous, "Hybrid Smart Contracts Explained", May 18, 2021, pp. 1-15, Retrieved from the Internet: https://web.archive.org/web/20210520052521/https://blog.chain.link/hybrid-smart-contracts-explained/.
International Search Report for International Application No. PCT/FR2022/051648, dated Nov. 23, 2022.

* cited by examiner

N1-N5

1030

METHOD FOR COMPUTER-IMPLEMENTED SERVICE PROVISION IN A BLOCKCHAIN, CORRESPONDING BLOCKCHAIN NETWORK NODE AND COMPUTER PROGRAM

INCORPORATION BY REFERENCE TO ANY PRIORITY APPLICATIONS

This application is filed under 35 U.S.C. § 371 as the U.S. National Phase of Application No. PCT/FR2022/051648 entitled "METHOD FOR PROVIDING A COMPUTER-IMPLEMENTED SERVICE IN A BLOCKCHAIN, AND CORRESPONDING BLOCKCHAIN NETWORK NODE AND COMPUTER PROGRAM" and filed Sep. 1, 2022, which claims the benefit of French Patent Application No. 2109204, filed Sep. 3, 2021, each of which is incorporated by reference in its entirety.

BACKGROUND

Field

The field of the development is that of computer-implemented technologies, and more particularly, the exchange of goods or services based on a blockchain information decentralised storage technology. More specifically, the development relates to a mechanism, implemented by a computer interfacing with at least one node of a blockchain network executing a smart contract of a blockchain, for the selection and decentralised connection of a service provider and a customer.

Prior Art and its Disadvantages

Blockchain is a transparent, secure information storage and transmission technology that operates without a central control body. More precisely, a blockchain is a distributed database that contains the history of all exchanges between its users since its creation: information sent by users and exchanges within the database are verified and grouped at regular intervals of time into blocks, thus forming a chain. All of this is secured by cryptography.

More precisely, transactions between the network users are grouped into blocks. Each block is validated by the network nodes, using cryptographic techniques that depend on the type of blockchain. Once the block is validated, it is time-stamped and added to the blockchain, that is accessible to all users. The transaction is then visible to all nodes of the network. Once a block has been added to the chain, it can no longer be changed or deleted, which guarantees the authenticity and security of the network.

There are public blockchains, which are open to all, and private or consortium blockchains, whose access and use are limited to a certain number of predefined stakeholders.

The first blockchains found applications in the field of digital currency, such as bitcoin, which is an example of a programmable currency. However, the decentralised nature of the blockchain, coupled with its security and transparency, suggests much broader applications than just the currency field.

Blockchain infrastructures have recently been enriched with "smart contracts", that can be defined as programs that automatically execute the terms and conditions of a contract, without requiring any human intervention. In other words, a smart contract is a compiled computer program that carries a set of features allowing it to execute automatically and autonomously at least some of the specific clauses of the contract it carries. The emergence of these smart contracts opens up new applications for blockchains, particularly in the exchange of goods and services.

Indeed, the use of marketplaces (i.e., platforms that connect a service provider and a service requester) for outsourcing tasks has so far encountered a number of technical issues, to which the blockchain infrastructure, coupled with the use of smart contracts, could help provide effective solutions:

Examples of technical issues encountered include:

- lack of transparency in data management and offer allocation. Indeed, the offer allocation protocol should not be controlled by only one stakeholder, and every service provider who has submitted an offer should have the opportunity to be considered equally.
- need for confidentiality: in a competitive context, the various service offers proposed in response to a call for tenders must be kept secret from all service providers submitting a service offer. For example, the price, or the capacity of a truck, determining factors in the choice of allocation, cannot be provided publicly to any entity.

Various solutions have been considered to address these issues. However, while these various solutions of the prior art are interesting in that they show the value of using blockchains and smart contracts in a context of connecting service providers and customers, they do not address at least some of the issues mentioned above, and in particular the offer confidentiality issue.

There is therefore a need for a technique for connecting service providers and customers, or tasks and resources, that does not have all the various disadvantages of the prior art, and that aims to address at least some of these various issues.

SUMMARY

The development addresses this need by proposing a service offer processing method implemented by a computer interfacing with at least one node belonging to a blockchain network configured to execute a smart contract.

According to at least one embodiment of the present solution, said method comprises:

- receiving encrypted service offers, in association with said smart contract;
- decrypting first decryption keys by means of a private encryption key of said computer,
- decrypting said encrypted service offers by means of said first decryption keys,
- transmitting, to at least one node of said blockchain network, an identifier of at least one of said decrypted service offers.

According to at least one embodiment, said at least one decrypted service offer whose identifier is transmitted is one of said decrypted service offers, meeting at least one service selection criterion for said smart contract.

According to at least one embodiment, the content of the service offers is encrypted using a homomorphic encryption, and the binary result of a comparison between two service offers is obtained by testing an equality between a tested service offer and a local extremum determined by comparing the tested service offer with another service offer.

According to at least one embodiment, the method further comprises:

- transmitting the comparison binary vector to a device in possession of a homomorphic encryption key by means of which the content of the service offers has been encrypted, receiving said decrypted binary vector, a step of determining said identifier taking into account said decrypted binary vector.

According to at least one embodiment, the method comprises, prior to receiving the encrypted service offers, transmitting a public encryption key corresponding to said private key to the smart contract.

According to at least one embodiment of the present solution, said method comprises the following steps of:

receiving encrypted service offers;

decrypting the symmetric encryption keys corresponding to said service offers and stored in said blockchain, by means of a private encryption key of said computer, decrypting said encrypted service offers by means of said corresponding symmetric encryption keys, identifying at least one service offer meeting at least one service selection criterion, referred to as a candidate offer, from the decrypted service offers, transmitting, to the smart contract, an identifier of at least one candidate offer.

Such a service offer processing method is characterised by its ability to identify at least one service offer of a service provider responding to a call for tenders in an autonomous, objective and confidential manner.

For this purpose, the method described above is based on blockchain technology and on the introduction of an oracle. An oracle is a third-party service run by one or more nodes, hereafter referred to as computers, interfacing the blockchain network with the outside world, such as the Internet. An oracle can feed external information back to a smart contract, or perform calculations on behalf of the smart contract in order to reduce the latter's calculation costs. Oracles are, by definition, trusted entities.

Such a method can for example help reduce the transaction costs by delegating the service offer evaluation task to the oracle.

This delegation of service offer evaluation, coupled with a double level of encryption of service offers, can for example help guarantee the integrity of the process for evaluating service offers as well as the confidentiality of the latter, since no entity has access to the content of service offers.

Thus, such a method can help provide an interesting solution to the lack of transparency issue often pointed out in data management and offer allocation. Indeed, unlike solutions of the prior art, in which connection is often established by centralised third-party platforms that are often prone to a lack of transparency with regard to the storage of stakeholders' information, the present solution is based on the use of a smart contract that stores all its actions in the blockchain and on the use of an oracle that does not access the sensitive content of the offers processed.

This solution responds to at least some of the confidentiality needs of the parties by encrypting their offers while providing a more transparent governance through the decentralisation offered by the blockchain.

According to at least one embodiment, the method comprises determining a binary vector for comparing service offers, a binary component of said vector for comparing service offers representing a result of a comparison between two service offers.

In at least some of the embodiments of the present solution, identifying at least one candidate offer further comprises determining a binary vector for comparing service offers, a binary component of said vector for comparing service offers representing a result of a comparison between two service offers.

The result of the various comparisons being presented in binary form, this contributes to maintaining the confidentiality of the offers and their content. Indeed, the only item of information available is an item of information indicating who won the comparison, unlike "zero knowledge proof" approaches which although preserving the confidentiality of the service offers are limited by the fact that the value of the service offers studied becomes accessible on the blockchain network once the auctions are closed.

In some cases where the content of the services offers is encrypted using a homomorphic encryption, the binary result of a comparison between two service offers is obtained by testing an equality between a tested service offer and a local extremum determined by comparing the tested service offer with another service offer.

The present solution can implement a partially homomorphic encryption, that is that applies only to certain types of mathematical operations, as well as a fully homomorphic encryption, that is that applies to any type of mathematical operation.

Thus, in cryptography, a Fully Homomorphic Encryption (FHE) is an encryption that has certain algebraic characteristics that make it switch with all mathematical operations, that is decrypting the result using various mathematical operations, in particular multiplication and addition to implement functions such as average, maximum or minimum, for example, on encrypted data gives the same result as this mathematical operation on non-encrypted data; this property makes it possible to entrust calculations to an external agent, without the data or results being accessible to this agent.

Some embodiments can in particular implement a partially homomorphic encryption applying notably to multiplication and addition.

A homomorphic encryption can be used for a blind evaluation of the offers of a competing service provider's nodes in the sense that it is not necessary to have access to the decrypted content of the service offers to evaluate them. This technique can indeed be used to perform calculations on encrypted numbers. This makes it possible to compare encrypted offers in a decentralised allocation system managed by a blockchain.

Thus, the present solution does not have the disadvantages of trust enclave approaches. Indeed, such trust enclaves consist in offering an enclave within which submitted service offers are decrypted in order to be evaluated and compared. The smart contract acts as a bridge between the nodes of a service provider, the nodes of the customer who published the call for tenders and the enclave. A major limitation of this approach is that within this enclave, it is possible to access the content of service offers in clear text.

In at least some embodiments of the present solution, once the evaluation of service offers whose content is encrypted using a homomorphic encryption has been performed, the method further comprises:

a step of transmitting the binary vector for comparing service offers to a device in possession of a homomorphic encryption key by means of which the content of the service offers has been encrypted, a step of receiving a decrypted binary vector for comparing service offers, a step of determining an identifier of at least one candidate offer.

Thus, while maintaining data confidentiality, it is possible to obtain the result of the various comparisons performed. Indeed, the binary content of the comparison vector provides information about maximum offers: the ith coordinate of the comparison binary vector corresponding to a maximum offer has a non-zero value.

According to at least some embodiments of the present solution, the method can comprise transmitting a public encryption key corresponding to said private key to the smart contract.

The development also relates to a service provision method implemented by a node belonging to a blockchain network configured to execute a smart contract of said blockchain for the provision of at least one service.

According to at least one embodiment, said method comprises:

- transmitting, to a computer interfacing with said node, a list of service offers associated with said smart contract and encrypted, and the first decryption keys, stored in said blockchain, of said encrypted service offers, said transmitted first decryption keys being themselves encrypted by means of a public encryption key issued by said computer,
- receiving an identifier of at least one of said encrypted service offers transmitted to said computer.

According to at least one embodiment, said method comprises selecting a service offer of which an identifier is received by said node based on information relating to said service offer of which said identifier is received by said node stored in said blockchain.

According to at least one embodiment, said selected service offer is the service offer of which an identifier is received by said node having the earliest storing timestamp in said blockchain.

According to at least one embodiment, the method comprises, prior to transmitting the encrypted service offers to said computer, a permutation of service offers and, prior to selecting a service offer of which an identifier is received by said node, a reverse permutation of service offers.

According to at least one embodiment of the present development, said method comprises:

- transmitting, to a computer interfacing with said node, service offers encrypted using corresponding symmetric encryption keys stored in said blockchain, themselves encrypted by means of a public encryption key issued by said computer,
- receiving an identifier of at least one candidate service offer, from the encrypted service offers transmitted to said computer,
- selecting a service offer from said at least one candidate offer based on information relating to said at least one candidate offer stored in said blockchain.

In at least some embodiments of the present solution, in the event of a plurality of candidate offers, the offer selected is the candidate offer with the oldest storing timestamp in said blockchain.

Thus, in such embodiments of the present solution, when several service offers have been identified as meeting the criteria of a call for tenders, the service offer selected is the one that was submitted first.

In at least some embodiments of the present solution, in order to improve the integrity and confidentiality of the processing of service offers by the oracle, a service offer permutation step is implemented by the smart contract prior to transmitting the encrypted service offers to the oracle.

When service offers have been permuted with a view to being processed by the oracle, the smart contract implements, prior to the step of selecting a service offer from the candidate offers, a service offer reverse permutation step in order to be able to identify the latter.

So, in at least some of its embodiments, the present solution does not have the disadvantages of the "multi-party computing" approach. As a reminder, such an approach proposes peer-to-peer comparisons: service providers offering a service offer compare their encrypted service offers two by two, via private channels. They then reveal the result of each of the comparisons to the smart contract using zero-knowledge proof techniques. A well-known limitation of this "multi-party computing" approach, which is not present in the solution proposed by the inventors, lies in the fact that the smart contract is capable of reconstituting the order of the bids (from the most to the least expensive if the bis are based on a price, for example). This is not the case for the oracle, which does not have access to this information. Thus, the oracle evaluates the offers neutrally.

The development also relates to a computer interfacing with at least one node belonging to a blockchain network configured to execute a smart contract.

In at least some embodiments of the present solution, said computer comprises at least one processor configured to:

- receive encrypted service offers in association with said smart contract;
- decrypt first encryption keys by means of a private encryption key of said computer,
- decrypt said encrypted service offers by means of said first decryption keys,
- transmit, to at least one node of said blockchain network, an identifier of at least one of said decrypted service offers.

In at least some embodiments, said at least one decrypted service offer whose identifier is transmitted is one of said decrypted service offers meeting at least one service selection criterion for said smart contract.

In at least some embodiments, said at least one processor is configured to determine a binary vector for comparing service offers, a binary component of said vector for comparing service offers representing a result of a comparison between two service offers.

In at least some embodiments of the present solution, said computer comprises at least one processor configured to:

- receive encrypted service offers;
- decrypt symmetric encryption keys corresponding to said service offers and stored in said blockchain, by means of a private encryption key of said computer,
- decrypt said encrypted service offers by means of said corresponding symmetric encryption keys,
- identify at least one service offer meeting at least one service selection criterion, referred to as a candidate offer, from the decrypted service offers,
- transmit, to the smart contract, an identifier of at least one candidate offer.

The development also relates to a node belonging to a blockchain network, configured to execute a smart contract of said blockchain.

In at least some embodiments of the present solution, said node comprises at least one processor configured to:

- transmit, to a computer interfacing with said node, service offers associated with said smart contract and encrypted, and first decryption keys, stored in said blockchain of said encrypted service offers, said transmitted first decryption keys being themselves encrypted by means of a public encryption key issued by said computer,
- receive an identifier of at least one of said encrypted service offers transmitted to said computer.

In at least some embodiments, said at least one processor is configured to select a service offer of which an identifier is received by said node based on information relating to said at least one service offer, of which an identifier is received by said node, stored in said blockchain.

In at least some embodiments of the present solution, said node comprises at least one processor configured to:

- transmit, to a computer interfacing with said node, service offers encrypted using corresponding symmetric encryption keys stored in said blockchain, themselves encrypted by means of a public encryption key issued by said computer,
- receive an identifier of at least one candidate service offer, from the encrypted service offers transmitted to said computer,
- select a service offer from said at least one candidate offer based on information relating to said at least one candidate offer stored in said blockchain.

Finally, the development relates to computer program products comprising program code instructions for implementing the methods as described previously, when they are executed by a processor.

The development also relates to a computer-readable storage medium on which are saved computer programs comprising program code instructions for implementing the steps of the methods according to the development as described above.

Such a storage medium can be any entity or device able to store the programs. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer programs contained therein can be executed remotely. The program(s) according to the development can be downloaded in particular on a network, for example the Internet network.

Alternatively, the storage medium can be an integrated circuit in which the programs are embedded, the circuit being adapted to execute or to be used in the execution of the above-mentioned methods that are the subject of the development.

BRIEF DESCRIPTION OF THE DRAWINGS

Other purposes, features and advantages of the development will become more apparent upon reading the following description, hereby given to serve as an illustrative and non-restrictive example, in relation to the figures, among which.

DETAILED DESCRIPTION OF CERTAIN ILLUSTRATIVE EMBODIMENTS

The general principle of the development is based on the use of a blockchain structure, in a communication network, to design a platform connecting customers and service providers, supporting a decentralised, transparent and/or objective assignment of service offers to the service requests submitted by the customers. More particularly, the present solution is based on delegating some operations for processing the service offers submitted by service providers to a third-party service interfacing the blockchain structure with the outside world, such as the Internet, in order to guarantee the confidentiality and integrity of the service offer processing process. Such a platform corresponds to a blockchain-based service provision system described with reference to figure [FIG. 1].

Figure 1:
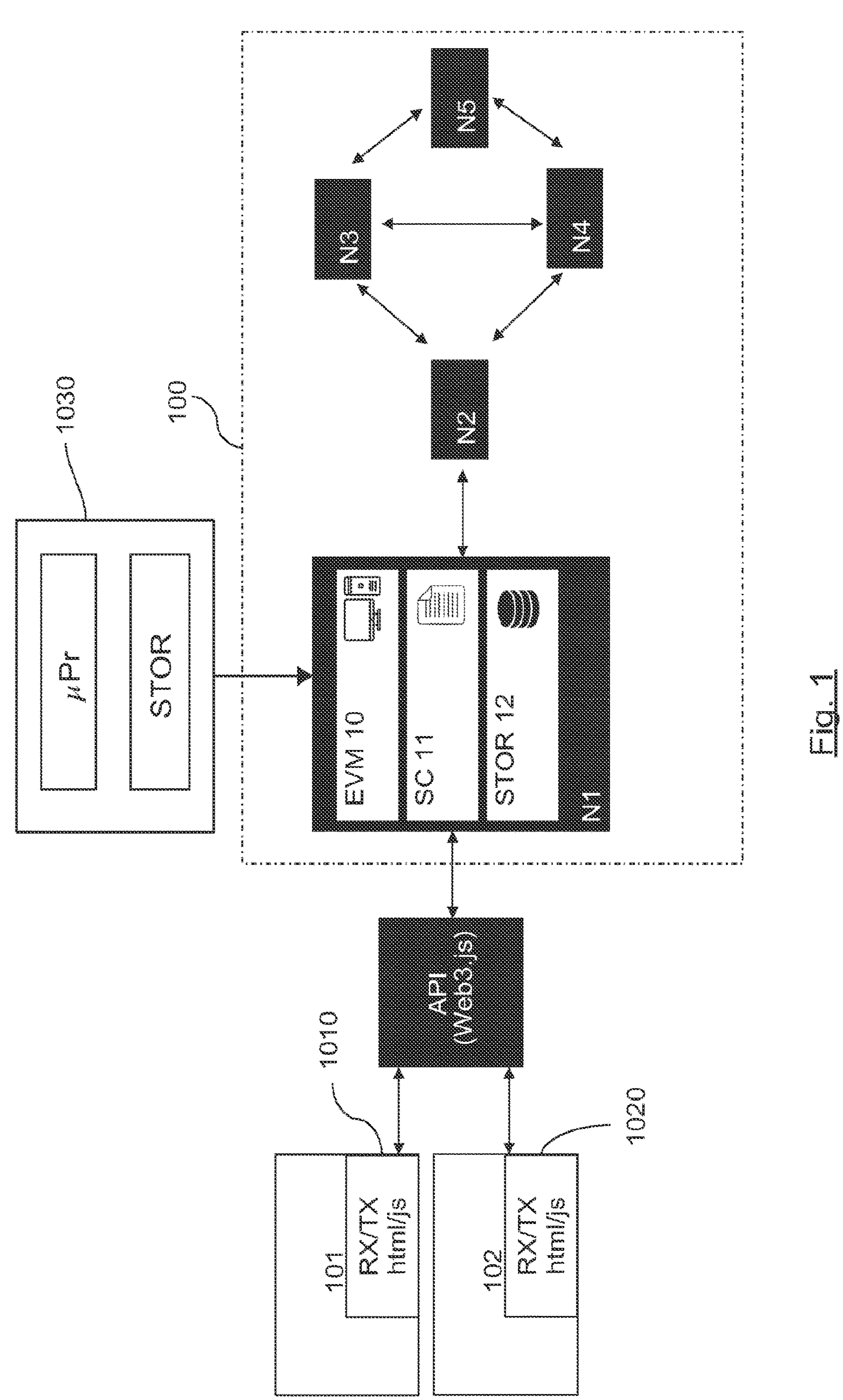
FIG. 1: this figure shows the architecture of a blockchain-based service provision system according to one embodiment of the development.

In relation to [FIG. 1], the architecture of a blockchain-based service provision system according to one embodiment of the development is now presented. Such a system can comprise a network of blockchains 100, hereinafter also referred to as blockchain network 100, comprising a plurality of nodes N1 to N5 interconnected to each other. The structure of the node N1 is illustrated in more detail. Each node N2 to N5 has an architecture similar to that of the node N1, although this has not been detailed in [FIG. 1] for the purposes of simplification. In this illustrated example, the term "node" refers exclusively to nodes N1-N5 of the blockchain network 100.

The term "node" can correspond to a software component as well as to a hardware component or a set of hardware and software components, a software component itself corresponding to one or more computer programs or sub-programs, or more generally, to any element of a program capable of implementing a function or set of functions.

More generally, a node Ni comprises a random access memory (for example, a RAM memory), a processing unit equipped for example with a processor and controlled by a computer program, representative of the code instructions of the smart contract SC 11, stored in a read-only memory (for example, a ROM memory or hard disk). At initialisation, the code instructions of the computer program are for example loaded into the random access memory before being executed by the processor of the processing unit.

Thus, in some embodiments, the node N1 can further comprise:

- an Ethereum virtual machine EVM 10, which is the execution environment for smart contracts in Ethereum. It is recalled that Ethereum is a decentralised exchange protocol that allows the users to create smart contracts using a Turing-complete language;
- a data storage area STOR 12;
- the bytecode of the smart contract SC 11, i.e. the deterministic code executable on the blockchain network 100, whose variables can be stored on the network 100, and whose functions can be called.

The backend of the service provision platform is thus decentralised, and resides in the smart contract SC 11 implementing a range of functions necessary to connect service providers and principals. As will be seen in more detail later, these functions that can be implemented by the smart contract SC 11 are the following:

Register( ), to store service requests or service offers in the blockchain network 100;

Filter( ), to filter service offers based on service selection criteria listed in a service request;

Sort( ), to sort the service offers that meet the criteria stipulated in the service request;

generateContract( ), to establish a contract between a service provider and a principal;

updateQoS( ), to store in said blockchain network 100 a quality of service corresponding to a provided service.

The users of the platform are, for example, the service provider nodes 101 and the principal, or customer, nodes 102. They can interact with the platform via their interface, or frontend. API (Application Programming Interface) requests enable interaction between the nodes 101, 102 on the one hand, and the smart contract SC 11 deployed on the blockchain network 100 on the other hand.

The client device of a principal 102 can comprise a transmission/reception RX/TX module 1020, configured to transmit service requests to the platform as well as an evaluation of a service provided, and to receive candidate service offers, selected by the platform. Such a client device can in particular comprise one or more processors, configured to execute program code instructions for transmitting and receiving such data, in particular in accordance with the HTML (HyperText Markup Language) and JS (JavaScript) programming languages.

The service provider node 101 comprises a transmission/reception RX/TX module 1010, configured to transmit service offers to the platform, and to receive contracts, established by the platform when a service offer has been elected to respond to a service request from a client device 102. Such a service provider node comprises in particular one or more processors, configured to execute program code instructions for transmitting and receiving such data, in particular in accordance with the HTML (HyperText Markup Language) and JS (JavaScript) programming languages.

The transactions listed and validated between the service provider nodes 101 and the customer nodes 102 can be stored as blocks in nodes N1 to N5 of the blockchain 100. Consensus rules can help limit malicious nodes, and identify invalidated transactions. Cryptographic rules can help ensure the pseudo-anonymity of transactions and users, and the authenticity of the service history of service provider nodes 101.

Finally, the blockchain-based service provision system according to one embodiment of the development further comprises an oracle 1030. An oracle 1030 is a third-party service run by one or more modules calling upon external APIs, hereafter referred to as computers, interfacing the blockchain network with the outside world, such as the Internet. For the sake of simplicity, only one computer is shown in figure [FIG. 1].

Such a computer 1030 may comprise:

at least one processor □Pr capable of executing at least one program for implementing the method according to one embodiment of the present solution;

a data storage area STOR storing said program as well as various data, such as parameters used for calculations performed by the processor. □Pr or intermediate data for calculations performed by the processor □Pr.

Figure 2:
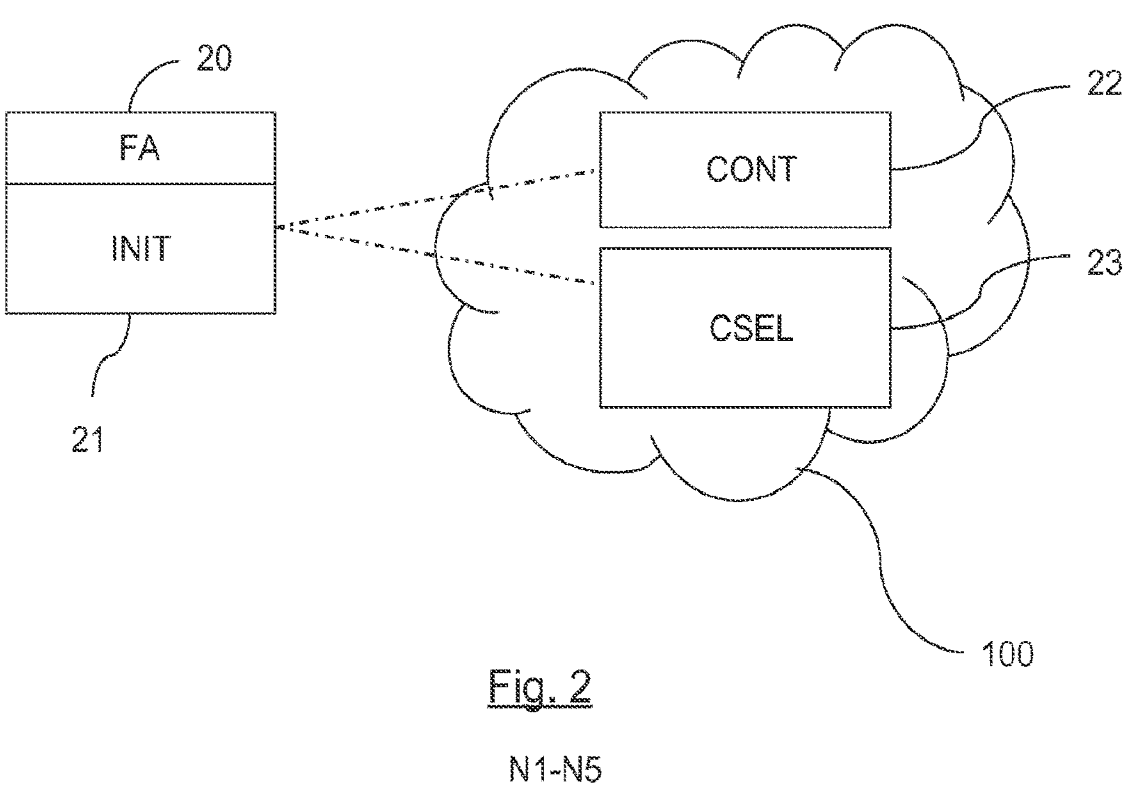
FIG. 2: this figure shows an instantiation time of the platform to adapt it, for example, to the application domain desired by the user.
Figure 6:
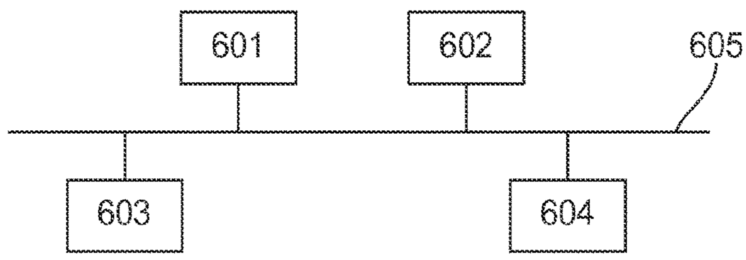
FIG. 6: this figure shows the architecture of a computer of the blockchain-based service provision system according to one embodiment of the development.

Figure [FIG. 1] only shows a particular one of several possible ways of realising a node Ni and an oracle 1030, so that they execute the steps of the method detailed hereafter, in relation to figures [FIG. 2] to [FIG. 6] (in any of the various embodiments, or in a combination of these embodiments). Indeed, these steps may be implemented either on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the node Ni or the oracle 1030 is realised with a reprogrammable computing machine, the corresponding programs (i.e. the sequences of instructions) may be stored in a removable (such as, for example, a floppy disk, CD-ROM or DVD-ROM) or non-removable storage medium, this storage medium being partially or totally readable by a computer or a processor.

According to one embodiment of the development, the connection platform is intended to be generic, in the sense that it does not fit into a particular use case, but can find applications in various fields, such as agriculture, maritime logistics, road transport logistics, personal services, industrial production, energy, etc.

As illustrated in [FIG. 2], before the platform becomes fully operational, it may therefore be necessary to allow time for instantiating the platform to adapt it, for example, to the desired application domain. In particular, the openness of the blockchain network 100 can be adjustable at instantiation (from the public blockchain to permissioned blockchains, and to private blockchains). Thus, this user can be a private stakeholder in the case of a private blockchain, or a consortium of stakeholders, in the case of a consortium blockchain. For example, the instantiation of the platform can be performed by a consortium of transport companies, in the case of a platform dedicated to the transport of goods.

Figure [FIG. 2] illustrates this instantiation time by a regulatory entity n, that could be noted "Field Authority" FA 20. In the example shown above, this regulatory entity FA 20 is the consortium of transport companies, which have previously agreed on the parameters for instantiating the platform.

Thus, during an initialisation phase INIT 21 of the platform rules, the parent user FA 20 can for example specify:

the expected legal contract body CONT 22, for example a consignment note for the transport of goods. This contract body CONT 22 is stored in the smart contract SC 11. This is a standard contract, corresponding to the type of service provision the platform will be dedicated to, that can be noted hereafter C;

the set P of objective selection criteria CSEL 23 that can be chosen by the principal nodes 102 to submit a service request to the platform. The service provider nodes 101 will have to fill in these various selection criteria when proposing a resource, or service offer, on the connection platform.

For example, in the example of a logistics application for transport companies, the selection criteria P can comprise:

the weight of the package to be delivered;

the volume of the package to be delivered;

the geographical area where the package will be picked up (for example, in the form of GPS (Global Positioning System) coordinates);

the geographical area where the package will be delivered (for example, in the form of GPS (Global Positioning System) coordinates);

the type of device used for delivery;

the price;

the elapsed time between package pick-up and delivery;

an identifier for the deliverer (their IMSI (International Mobile Subscriber Identity), for example).

Figure 3:
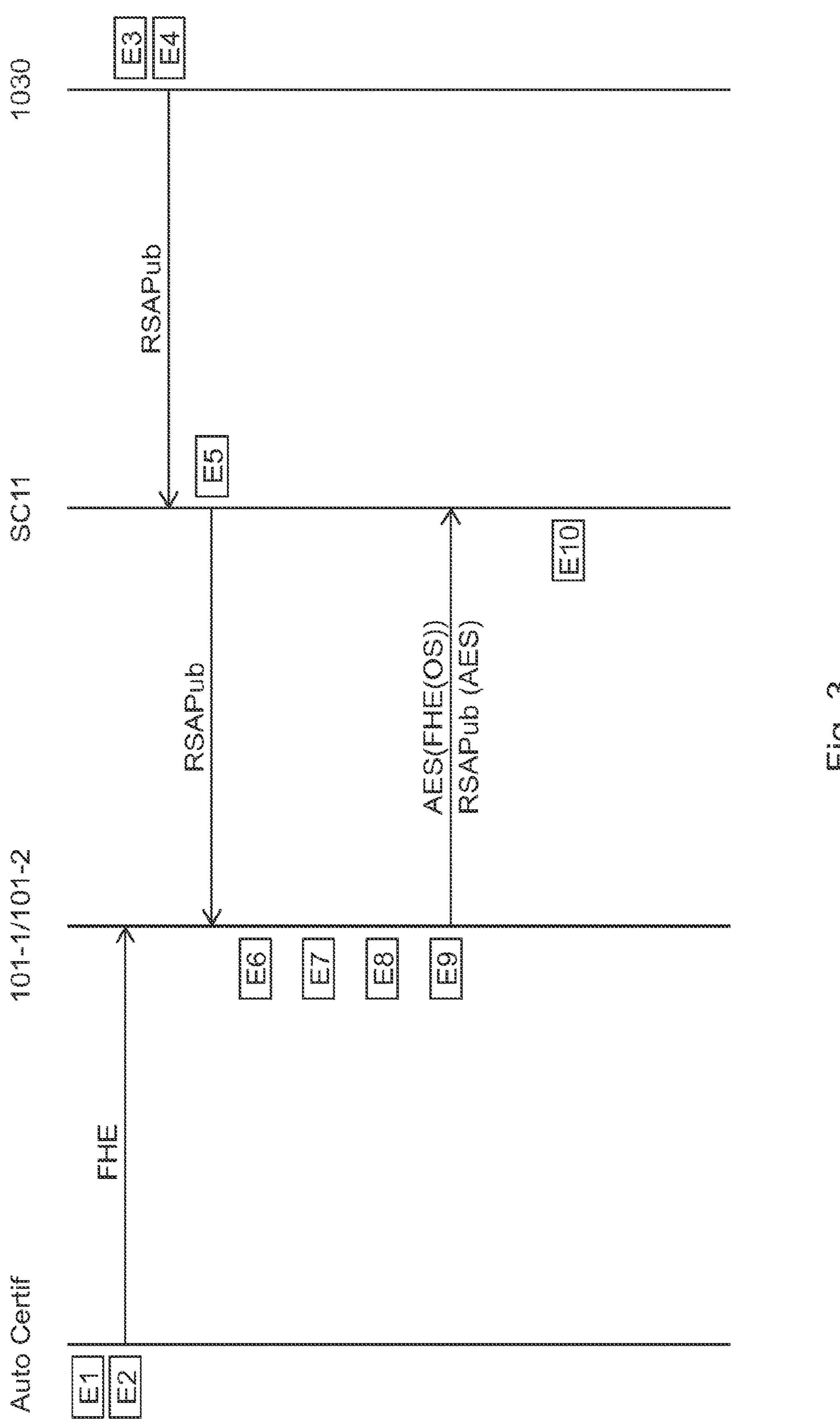
FIG. 3: this figure shows a sequential diagram of the steps of recording and processing the resources offered by various suppliers of goods or services.

In the illustrated embodiment, after finalisation of this instantiation phase, the platform 100 is operational to proceed with a storage and a processing of the resources offered by various nodes providing goods or services 101, as illustrated by the sequential diagram of [FIG. 3].

Indeed, the service provider nodes 101 interested in and authorised by the parent user FA 20 can offer their services to the platform, so that they are referenced in a service catalogue stored in the blockchain. This storing of the service offers in the blockchain can contribute to a strong security for potential customers 102, as it guarantees that the service provider nodes 101 cannot change the parameters of the service offer they propose (price, time, quantity, type of device, etc.) after contracting.

Thus, during a step E1, a certification authority AutoCertif (different or not from the entity FA, depending on the embodiments) generates a first FHE encryption key enabling a partially homomorphic or fully homomorphic FHE encryption to be applied. Such an FHE encryption key is unique and common to all of the service provider nodes 101-1, 101-2 responding to a given call for tenders.

A partially homomorphic encryption is a homomorphic encryption that only applies to certain types of mathematical operations. A fully homomorphic encryption, on the other hand, applies to any type of mathematical operation.

Thus, a fully homomorphic encryption (FHE) is an encryption that has certain algebraic characteristics that make it switch with all mathematical operations, that is decrypting the result using various mathematical operations, in particular multiplication and addition to implement functions such as average, maximum or minimum, for example, on encrypted data gives the same result as this mathematical operation on non-encrypted data; this property makes it possible to entrust calculations to an external agent, without the data or results being accessible to this agent.

In the remainder of the document, it is assumed for purposes of simplification that the encryption applied is a homomorphic encryption. It is clear, however, that the present application can also be applied with a partially homomorphic encryption applying in particular to multiplication and addition.

Such an FHE encryption key is unique and common to the various service provider nodes 101-1, 101-2 during a step E2.

At the same time, the oracle 1030 generates an encryption key pair comprising a public encryption key RSAPub and a corresponding private encryption key RSAPriv in a step E3. These encryption keys RSAPub and RSAPub are compliant with an asymmetric encryption such as an RSA encryption for "Rivest-Shamir-Adleman", named after its creators.

During a step E4, the oracle 1030 transmits the public encryption key RSAPub to the smart contract SC 11, which in turn transmits it to the service provider nodes 101-1, 101-2 in a step E5.

In a step E6, which may be prior to, concurrent with or subsequent to step E5, each service provider node 101-1, 102-2 can encrypt a service offer OS using a fully homomorphic encryption method by means of the FHE encryption key. A first encrypted version cFHE(OS) of the service offer OS is thus obtained. Such a step E6 can be optional.

Each service provider node 101-1, 101-2 can then encrypt, in a step E7, the first encrypted version cFHE (OS) of the service offer OS using a symmetric encryption method by means of an AES symmetric encryption key specific to each service provider node 101-1, 101-2. A second encrypted version cAES(cFHE(OS)) of the service offer OS, referred to as the service offer to be transmitted to the oracle cAES(cFHE(OS)), is thus obtained. An example of such a symmetric encryption is the AES (Advanced Encryption Standard) encryption.

In a step E8, which may be prior to, concurrent with or subsequent to step E6 and/or step E7, each service provider node 101-1, 101-2 encrypts its AES symmetric encryption key using an asymmetric encryption method by means of the public encryption key RSAPub received during step E5. An encrypted version rSAPub(AES) of the AES symmetric encryption key is thus obtained.

In a step E9, the service provider nodes 101-1, 101-2 send to the connection platform their service offers to be transmitted cAES(cFHE(OS)) accompanied by the encrypted versions RSAPub(AES) of their respective AES symmetric encryption keys. The service offers to be transmitted cAES (cFHE(OS)) and the encrypted versions RSAPub(AES) of their respective AES symmetric encryption keys can be transmitted jointly or not.

Upon receipt, the smart contract SC 11 can store the offers received from the service provider nodes 101-1 and 102-2, and the encrypted versions of the associated keys, in the blockchain 100 during a step E10.

Once the call for tenders is closed and all service offers to be transmitted have been stored in the blockchain 100, the smart contract SC 11 delegates the processing of these service offers to be transmitted to the oracle. Such a delegation can help reduce the computational load in the blockchain network and/or the cost to the service provider nodes 101-1, 101-2.

Figure 4:
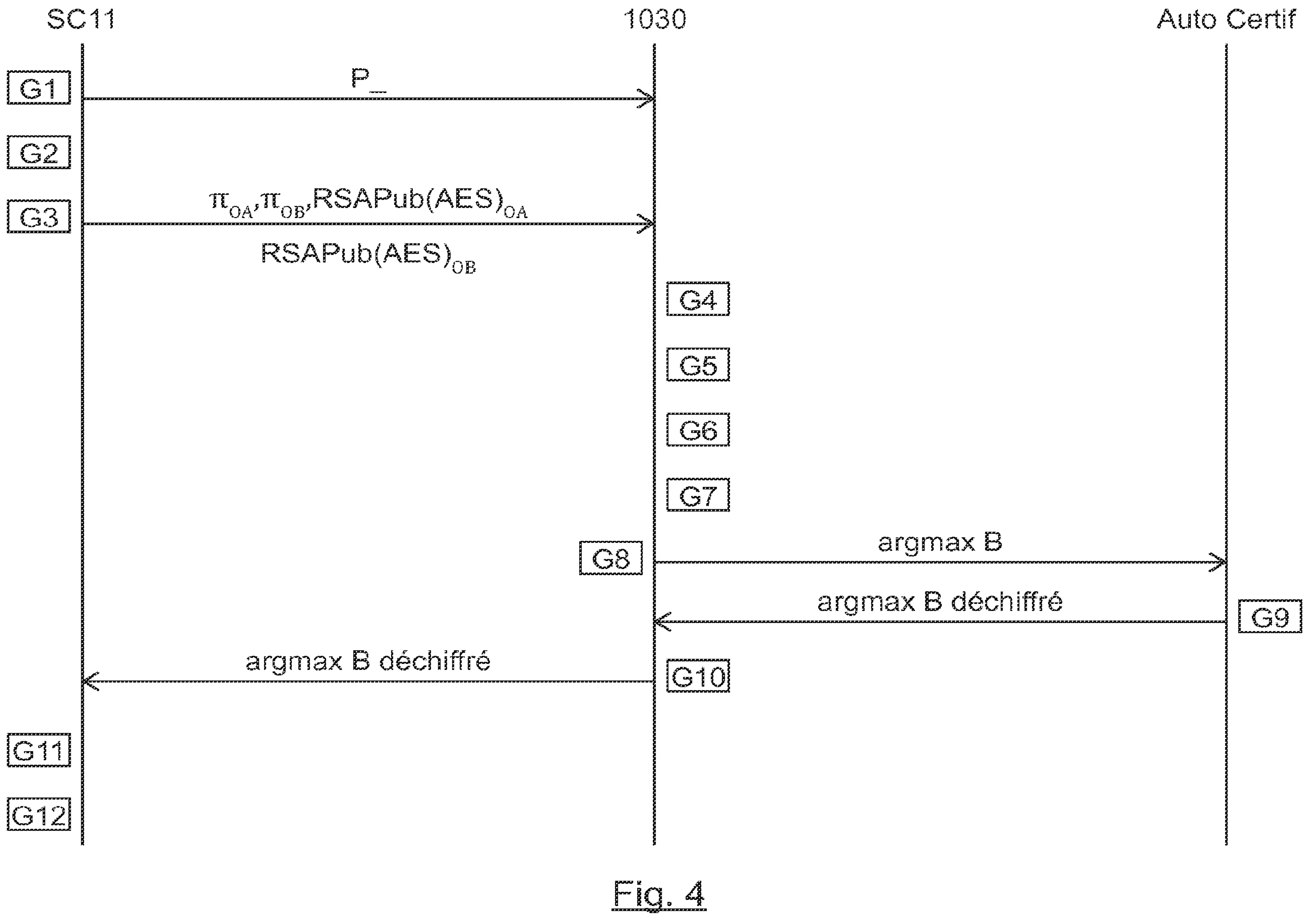
FIG. 4: this figure shows a sequential diagram of the steps of processing the service offers to be transmitted cAES (cFHE(OS)) by the oracle 1030 and the smart contract SC 11.

The processing of the service offers to be transmitted cAES(cFHE(OS)) by the oracle 1030 and the smart contract SC 11 is described in more detail with reference to [FIG. 4].

In a step G1, the smart contract SC 11 can sort the profiles of the service provider nodes wanting to submit a service offer based on public data stored in the blockchain. For example, the smart contract SC 11 determines the eligible service provider nodes and then sends them a request asking them to provide the private data needed to discriminate (filter, for example) their service offers.

In some embodiments, in order, for example, to prevent the oracle 1030 from being able to use the order of receipt of the service offers to be processed and thus call into question the integrity of the processing process, the smart contract SC 11 can, in a step G2, permute the order of the service offers prior to their transmission to the oracle 1030. Such a step G2 is optional. In the remainder of the present document, it is assumed that the offers to be transmitted cAES(cFHE(OS)) have been permuted, and these permuted offers to be transmitted cAES(cFHE(OS)) are noted $\pi_{OA}$, $\pi_{OB}$. Thus, the offer OA corresponds to the offer to be transmitted from the service provider node 101-1 and the offer OB corresponds to the offer to be transmitted from the service provider node 101-2. For example, the offer OA was submitted first to the smart contract SC 11 and is associated with at least one item of timestamp data, such as a submission date and time, prior to the item of timestamp data associated with the offer OB.

Once the offers to be transmitted have been permuted, the smart contract SC 11 transmits these offers $\pi_{OA}$, $\pi_{OB}$ to the oracle 1030 in a step G3. In a first implementation, the offers $\pi_{OA}$, $\pi_{OB}$ are transmitted with encrypted versions RSAPub $(AES)_{OA}$, RSAPub$(AES)_{OB}$ of the AES symmetric encryption keys corresponding respectively to each of the offers $\pi_{OA}$, $\pi_{OB}$. In a second implementation, the offers $\pi_{OA}$, $\pi_{OB}$ and encrypted versions RSAPub$(AES)_{OA}$, RSAPub$(AES)_{OB}$ of the AES symmetric encryption keys corresponding respectively to each of the offers $\pi_{OA}$, $\pi_{OB}$, are transmitted separately. In this second implementation, a first n-upplet corresponds to the set of offers and a second n-upplet corresponds to the set of encrypted versions RSAPub(AES)$_{OA}$, RSAPub(AES)$_{OB}$ of the AES symmetric encryption keys corresponding respectively to each of the offers $\pi_{OA}$, $\pi_{OB}$. For example, both the first and second nu-upplet have the same scheduling to enable the offers and the encrypted versions RSAPub(AES)$_{OA}$, RSAPub(AES)$_{OB}$ of the corresponding AES symmetric encryption keys to be associated.

Using the private encryption key RSAPriv corresponding to the public encryption key RSAPub, the oracle 1030 can decrypt the encrypted versions RSAPub(AES)$_{OA}$, RSAPub (AES)$_{OB}$ of the AES symmetric encryption keys corresponding respectively to each of the offers $\pi_{OA}$, $\pi_{OB}$ during a step G4. AES symmetric encryption keys $_{OA}$ and $_{OB}$ corresponding to each of the offers $\pi_{OA}$, $\pi_{OB}$ are then obtained.

During a step G5, the oracle 1030 then decrypts the offers $\pi_{OA}$, $\pi_{OB}$ by means of the corresponding AES symmetric encryption keys $_{OA}$ and $_{OB}$. At the end of step G5, the decrypted offers $\pi_{OA}$, $\pi_{OB}$ are obtained.

When step E6 has been implemented by the service provider nodes 101-1, 101-2, the content of the decrypted offers $\pi_{OA}$, $\pi_{OB}$ corresponds to the content of the service offers OS encrypted by means of the FHE key. In such a case, the oracle 1030 only has access to the content encrypted by means of the homomorphic encryption of the decrypted offers $\pi_{OA}$, $\pi_{OB}$. The oracle 1030 then processes the encrypted content of the decrypted offers $\pi_{OA}$, $\pi_{OB}$, thus preserving the confidentiality of service offers OS.

Once the offers $\pi_{OA}$, $\pi_{OB}$ have been decrypted, the oracle 1030 can then identify the winning service offer(s) $\pi_{OA}$, $\pi_{OB}$ from the list of offers transmitted by the smart contract SC 11. In the present example, the list of service offers transmitted is [$\pi_{OA}$, $\pi_{OB}$], of course, this list can include more than two service offers. The respective indexes associated with the service offers $\pi_{OA}$, $\pi_{OB}$ in order to identify them are 0 and 1. If the oracle 1030 determines that the service offer $\pi_{OA}$ is the winning offer, the oracle 1030 will send back the index corresponding to this offer $\pi_{OA}$, here 0, to the smart contract SC 11. If, on the contrary, the oracle 1030 determines that the service offer $\pi_{OB}$ is the winning offer, the oracle 1030 will send back the index corresponding to this offer $\pi_{OA}$, here 1.

To do this, the oracle can, for example, implement two algorithms described below. The algorithm 1 can, for example, be used to generate an offer comparison vector known as the argmax vector B. The algorithm 2 can, for example, be used to determine the value of a variable t used the in algorithm 1 presented in the appendix.

In a step G6, the oracle 1030 initialises the algorithm 1. In the example described, the content o of the offers $\pi_{OA}$, $\pi_{OB}$ is encrypted by means of the FHE key. To do this, the oracle 1030 uses the following variables: the list C of offers, Ci represents the element i of the offer vector C (ci=C[i]). In the algorithm 1, "!=" means "≠".

The oracle 1030 then compares the various offers two by two. Thus, in a step G7, corresponding to lines 6 to 8 of the algorithm 1, the oracle 1030 determines a local maximum between a first offer C[i] and a second offer C[j]. Once the value m corresponding to the local maximum has been obtained, the oracle 1030 can, for example, implement the algorithm 2 in order to determine the value of the variable b to be applied. The algorithm 2 is also presented in the appendix.

The "testEquality" function is based on Fermat's little theorem.

For two encrypted variables A and B, Fermat's little theorem states that when A!=B (as in the algorithm 1, here, too, "!=" means "≠"), then (A−B) p−1 is congruent to 1 mod p, so t=1(A−B) p−1 is 0.

According to Fermat's little theorem, when A=B, then (A−B) is 0, and t is assigned the value 1. In this use case, t is then multiplied by a variable $c_n$ corresponding to the number of a natural integer n where n is greater than 1, in order to better distinguish between 0 and 1. Indeed, the calculations performed on data encrypted by means of a homomorphic encryption such as an FHE encryption generate noise linked to the encryption techniques.

In this way, the oracle can apply the algorithm 2 to the variables C[i] and m. If the variable C[i] is greater than the local maximum m, then the variable b of the algorithm 1, which corresponds to the variable t of the algorithm 2, takes the value $c_n$. If, on the contrary, the variable C[i] is less than the local maximum m, then the variable b takes the value $c_0$ (the number 0).

The result of the operation B[i]+b is then stored as a coordinate of the argmax vector B.

The step G7 can be carried out until all service offers received have been compared two by two. For each occurrence, a value B[i]+b can be stored as a coordinate of the argmax vector B. Such an argmax vector B can comprise as many coordinates as the number of offer comparisons to be made. The coordinates of the argmax vector B can take only two values: 0 or B[i]+b.

In a case where the content of the offers is encrypted using a homomorphic encryption, the oracle 1030 can transmit, in a step G8, the argmax vector B obtained to the certification authority AutoCertif that generated the FHE encryption key so that the certification authority AutoCertif can decrypt the argmax vector B.

Once the argmax vector B has been decrypted by means of the FHE encryption key, the certification authority AutoCertif can transmit the decrypted argmax vector B to the oracle 1030 in a step G9.

Once it has access to a decrypted argmax vector B, the oracle 1030 is able to provide the smart contract SC 11 with an identifier of one or more winning offers. To do this, the oracle transmits, for example, the decrypted argmax vector to the smart contract SC 11 in a step G10.

If the smart contract SC 11 has permuted the offers before transmitting them to the oracle 1030, then it applies, in a step G11, a reverse permutation to the argmax vector B so that the winning service offer(s) can be correctly identified.

In a step G12, the smart contract SC 11 can determine the number of winning service offers. To do this, the smart contract SC 11 determines, for example, whether the argmax vector B comprises one or more global maxima. If the argmax vector B comprises a single global maximum (e.g., B=[val_max, val_min, 0]), this means that there is only one winning service offer. The smart contract SC 11 can then inform the service provider node issuing the winning service offer and store the result in the blockchain.

If the argmax vector B comprises several identical global maxima (e.g., B=[val_max, val_min, 0]), this means that there are several winning service offers. The smart contract SC 11 can then select a service offer from these candidate service offers, for example the service offer associated with the oldest item of timestamp data from the set of timestamp data associated with the various candidate service offers.

The smart contract SC 11 can then inform at least some of the various service provider nodes issuing candidate service offers of the outcome of the call to tenders, that is if the offer has been declined or accepted. All these exchanges are stored by the smart contract SC 11 in the blockchain.

In a use case example of the present solution, it is assumed that three delivery companies, LA, LB and LC, want to participate in a call for tenders. The three companies LA, LB and LC sign up to the call for tenders in advance via the smart contract SC 11.

As part of this call for tenders, the oracle 1030 generates a private key RSAPriv/public key RSAPub pair and makes the public key RSAPub available to the smart contract SC 11.

A service requester asks the smart contract for a deliverer to be recruited. They want a long-distance delivery from town v1 to town v2, using a truck with a minimum capacity of 33 $m^3$. They stipulate the duration of the tender as T=72 h.

During this period T, the smart contract SC 11 sorts the profiles of the delivery companies LA, LB and LC on the basis of registered public data such as availability and location.

The smart contract SC 11 stipulates that only companies LA and LB are eligible. The smart contract SC 11 then sends a request to companies LA and LB asking them to provide private data needed to discriminate between their offers, such as price and available capacity.

The smart contract SC 11 sends in parallel a list of the addresses in the blockchain network of companies LA and LB to the certification authority AutoCertif. In response to this request, the certification authority AutoCertif sends the FHE encryption key to companies LA and LB via the blockchain network.

Subsequently, each of the companies LA and LB asks the smart contract SC 11 for the public key RSAPub in order to encrypt its service offer. Then, each of the companies LA and LB encrypts each of the elements of its offer: price and capacity, by sequentially applying the homomorphic encryption by means of the FHE encryption key and then the symmetric encryption by means of the AES encryption key. Companies LA and LB then encrypt their AES symmetric encryption key by means of the key RSAPub.

The offers encrypted in this way and the encrypted AES encryption keys are transmitted to the smart contract SC 11, that stores them in the blockchain.

The smart contract SC 11 then permutes the encrypted offers to maintain the confidentiality of the bid order: it therefore inverts the offers OA from company LA and OB from company LB. It then sends the permuted offers to the oracle 1030 and asks it to compare offers OA and OB.

The oracle 1030 uses the private key RSAPriv to decrypt each of the elements making up the offers $\pi_{OA}$, $\pi_{OB}$ received. For the offer $\pi_{OA}$, [C(capacityLA), C(priceLA)] is obtained, where C=Encrypted.

The 1030 oracle calculates the encrypted average of $\pi_{OA}$: $\pi_{OA}$=(C(capacityLA)+C(priceLA))/2. It does the same for $\pi_{OB}$, and then applies the comparison algorithm between $\pi_{OA}$ and $\pi_{OB}$. Suppose that $\pi_{OA}>\pi_{OB}$, then the argmax vector B sent back by the oracle 1030 is [C(10), C(0)].

The oracle 1030 sends a request for decrypting the argmax vector B to the certification authority AutoCertif.

The certification authority AutoCertif then sends back to the oracle 1030 a decrypted argmax vector B, i.e., [10,0]. The oracle 1030 send back this decrypted argmax vector to the smart contract SC 11.

The smart contract SC 11 applies a reverse permutation to the decrypted argmax vector B and identifies company LB's offer as the winning offer. The smart contract SC 11 then generates a contract the company LB and the service requester. In parallel, it sends a notification to the company LA informing it that its offer has not been chosen. All these exchanges are stored in the blockchain.

Figure 5:
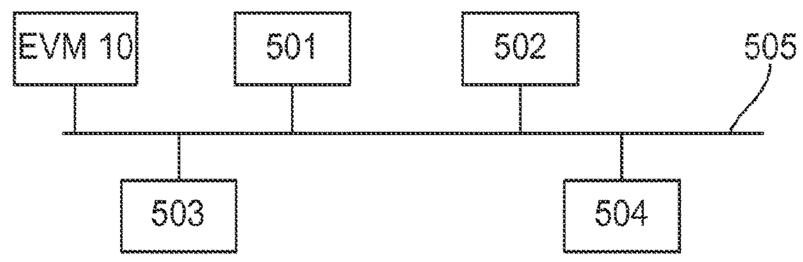
FIG. 5: this figure shows a node of a blockchain-based service provision system according to one embodiment of the development.

FIG. 5 shows a node N1-N5 belonging to a blockchain network capable of implementing certain steps of the previously described solution.

A node N1-N5 can comprise at least one hardware processor 501, a storage unit 502 corresponding to the memory STOR 12 of figure [FIG. 1], a first interface 503, and at least a second network interface 504 and an Ethereum virtual machine EVM 10 which are connected to each other via a bus 505. Naturally, the components of the node N1-N5 can be connected by means of a connection other than a bus.

The processor 501 controls the operations of the node N1-N5. The storage unit 502 stores at least one program for implementing the various methods that are the subject of the development to be executed by the processor 501, and various data, such as parameters used for calculations performed by the processor 501, intermediate data for calculations performed by the processor 501, etc. The processor 501 may be formed by any known and appropriate hardware or software, or by a combination of hardware and software. For example, the processor 801 can be formed by a dedicated hardware such as a processing circuit, or by a programmable processing unit such as a Central Processing Unit which executes a program stored in a memory thereof.

The storage unit 502 may be formed by any appropriate means capable of storing the program or programs and data in a computer-readable manner. Examples of storage devices 502 include non-transitory computer-readable storage media such as semiconductor memory devices, and magnetic, optical or magneto-optical recording media loaded into a read/write device.

The interface 503 provides an interface between the node N1-N5 and another node N1-N5 of the blockchain network.

As for the network interface 504, it provides a connection between the node N1-N5 and the oracle 1030.

FIG. 6 shows a computer or oracle 1030 capable of implementing certain steps of the previously described solution.

An oracle 1030 can comprise at least one hardware processor 601 corresponding to the processor □Pr of figure [FIG. 1], a storage unit 602 corresponding to the memory STOR of [FIG. 1], a first interface 603, and at least a second network interface 604 which are connected to each other via a bus 605. Naturally, the components of the oracle 1030 can be connected by means of a connection other than a bus.

The processor 601 controls the operations of the oracle 1030. The storage unit 602 stores at least one program for implementing the various methods that are the subject of the development to be executed by the processor 601, and various data, such as parameters used for calculations performed by the processor 601, intermediate data for calculations performed by the processor 601, etc. The processor 601 may be formed by any known and appropriate hardware or software, or by a combination of hardware and software. For example, the processor 601 can be formed by a dedicated hardware such as a processing circuit, or by a programmable processing unit such as a Central Processing Unit which executes a program stored in a memory thereof.

The storage unit 602 may be formed by any appropriate means capable of storing the program or programs and data in a computer-readable manner. Examples of storage devices 602 include non-transitory computer-readable storage media such as semiconductor memory devices, and magnetic, optical or magneto-optical recording media loaded into a read/write device.

The interface 603 provides an interface between the oracle 1030 and another computer also acting as an oracle.

As for the network interface 604, it provides a connection between the oracle 1030 and at least one node N1-N5 of the blockchain network.

The invention claimed is:

1. A service offer processing method implemented by a computer interfacing with at least one node belonging to a blockchain network configured to execute a smart contract of the blockchain, the method comprising:

receiving encrypted service offers, in association with the smart contract;

receiving first decryption keys, stored in the blockchain, of the encrypted service offers, the first decryption keys being themselves encrypted by means of a public encryption key issued by the computer;

decrypting first decryption keys by means of a private encryption key of the computer, decrypting the encrypted service offers by means of the first decryption keys, determining a binary vector for comparing service offers among the decrypted service offers, a binary component of the vector for comparing service offers representing a result of a comparison between two service offers, and transmitting, to at least one node of the blockchain network, an identifier of at least one of the decrypted service offers, taking into account the binary vector.

2. The service offer processing method according to claim 1, wherein the at least one decrypted service offer whose identifier is transmitted is one of the decrypted service offers, meeting at least one service selection criterion for the smart contract.

3. The service offer processing method according to claim 1, wherein the content of the services offers is encrypted using a homomorphic encryption, and the binary result of a comparison between two service offers is obtained by testing an equality between a tested service offer and a local extremum determined by comparing the tested service offer with another service offer.

4. The service offer processing method according to claim 1, further comprising:

transmitting the comparison binary vector to a device in possession of a homomorphic encryption key by means of which the content of the service offers has been encrypted, receiving the decrypted binary vector, and determining the identifier taking into account the decrypted binary vector.

5. The service offer processing method according to claim 1 comprising, prior to receiving the encrypted service offers, transmitting a public encryption key corresponding to the private key to the smart contract.

6. A service provision method implemented by a node belonging to a blockchain network configured to execute a smart contract of the blockchain, the method comprising:

transmitting, to a computer interfacing with the node, a list of service offers in association with the smart contract and encrypted, and the first decryption keys, stored in the blockchain, of the encrypted service offers, the transmitted first decryption keys being themselves encrypted by means of a public encryption key issued by the computer, and receiving an identifier of at least one of the encrypted service offers transmitted to the computer, the identifier being determined by the computer based on a binary vector for comparing service offers, a binary component of the binary vector representing a result of a comparison between two service offers.

7. The service provision method according to claim 6, comprising selecting a service offer of which an identifier is received by the node based on information relating to the service offer, of which the identifier is received by the node, stored in the blockchain.

8. The service provision method according to claim 6, wherein the selected service offer is the service offer of which an identifier is received by the node having the earliest storing timestamp in the blockchain.

9. The service provision method according to claim 6 comprising, prior to transmitting the encrypted service offers to the computer, a permutation of service offers and, prior to selecting a service offer of which an identifier is received by the node, a reverse permutation of service offers.

10. A node belonging to a blockchain network, configured to execute a smart contract of the blockchain, the node comprising at least one processor configured for implementing a service provision method according to claim 6.

11. The node according to claim 10, wherein the at least one processor is configured to select a service offer of which an identifier is received by the node based on information relating to the service offer, of which the identifier is received by the node, stored in the blockchain.

12. The node according to claim 11, wherein the selected service offer is the service offer of which an identifier is received by the node having the earliest storing timestamp in the blockchain.

13. A non-transitory computer-readable storage medium on which is saved at least one computer program comprising program code instructions for executing the method according to claim 6, when the computer program is executed by a processor.

14. A computer interfacing with at least one node belonging to a blockchain network configured to execute a smart contract of the blockchain, the computer comprising at least one processor configured to:

receive encrypted service offers in association with the smart contract;

receive first decryption keys, stored in the blockchain, of the encrypted service offers, the first decryption keys being themselves encrypted by means of a public encryption key issued by the computer;

decrypt first encryption keys by means of a private encryption key of the computer, decrypt the encrypted service offers by means of the first decryption keys, and determine a binary vector for comparing service offers among the decrypted service offers, a binary component of the vector for comparing service offers representing a result of a comparison between two service offers, and transmit, to at least one node of the blockchain network, an identifier of at least one of the decrypted service offers, taking into account the binary vector.

15. The computer according to claim 14, wherein the at least one decrypted service offer whose identifier is transmitted is one of the decrypted service offers, meeting at least one service selection criterion for the smart contract.

16. The computer according to claim 14, wherein the processor is configured to:

transmit a comparison binary vector to a device in possession of a homomorphic encryption key by means of which a content of the service offers has been encrypted, receive the decrypted binary vector, and determine the identifier taking into account the decrypted binary vector.

17. The computer according to claim 14, wherein the processor is configured to, prior to receiving the encrypted service offers, transmit a public encryption key corresponding to the private key to the smart contract.

18. A non-transitory computer-readable storage medium on which is saved at least one computer program comprising program code instructions for executing the method according to claim 1.

* * * * *